United States Patent
Oehler, III

(10) Patent No.: US 9,817,015 B2
(45) Date of Patent: Nov. 14, 2017

(54) SYSTEM FOR PREDICTING EXTERIOR BALLISTICS

(71) Applicant: Kenneth L. Oehler, III, Austin, TX (US)

(72) Inventor: Kenneth L. Oehler, III, Austin, TX (US)

( * ) Notice: Subject to any disclaimer, the term of this patent is extended or adjusted under 35 U.S.C. 154(b) by 103 days.

(21) Appl. No.: 14/791,458

(22) Filed: Jul. 5, 2015

(65) Prior Publication Data

US 2016/0258973 A1 Sep. 8, 2016

Related U.S. Application Data

(60) Provisional application No. 62/128,873, filed on Mar. 5, 2015.

(51) Int. Cl.
| | |
|---|---|
| *G06F 19/00* | (2011.01) |
| *G01P 3/66* | (2006.01) |
| *F41G 5/08* | (2006.01) |
| *F41G 5/00* | (2006.01) |
| *F41G 11/00* | (2006.01) |

(52) U.S. Cl.
CPC ............... *G01P 3/665* (2013.01); *F41G 5/00* (2013.01); *F41G 5/08* (2013.01); *F41G 11/00* (2013.01)

(58) Field of Classification Search
CPC ... G01P 3/665; F41G 5/08; F41G 5/00; F41G 11/00; G06G 7/80; G06G 7/32; F42C 17/00

USPC ................. 235/412, 413, 417, 408
See application file for complete search history.

(56) References Cited

U.S. PATENT DOCUMENTS

| | | | | |
|---|---|---|---|---|
| 5,349,853 | A * | 9/1994 | Oehler | F41J 5/06 102/425 |
| 2015/0316644 | A1* | 11/2015 | Sundberg | F42B 35/00 367/127 |
| 2016/0245613 | A1* | 8/2016 | Grossnickle | F41B 6/003 |

* cited by examiner

*Primary Examiner* — Karl D Frech
(74) *Attorney, Agent, or Firm* — Bennet K. Langlotz; Langlotz Patent & Trademark Works, Inc.

(57) ABSTRACT

A system for predicting exterior ballistics has first and second bullet detectors operable to detect the passage of a bullet, the first and second bullet detectors being spaced apart by a selected detector spacing distance, the first and second bullet detector each being connected to a common time signal facility that generates a time signal, the first bullet detector being operable to generate a first time of passage based on the time signal, the second bullet detector being operable to generate a second time of passage based on the time signal, the first bullet detector being operable to measure a first bullet velocity, a controller in communication with the first and second bullet detectors, and the controller operable based on the difference between the first time and the second time, and based on the first bullet velocity to calculate a ballistic characteristic for the bullet.

19 Claims, 10 Drawing Sheets

FIG. 5

Sample Test Report

FIG. 6

SYSTEM FOR PREDICTING EXTERIOR BALLISTICS

CROSS-REFERENCE TO RELATED APPLICATION

This application claims the benefit of U.S. Provisional Patent Application No. 62/128,873 filed on Mar. 5, 2015, entitled "SYSTEM FOR PREDICTING EXTERIOR BALLISTICS," which is hereby incorporated by reference in its entirety for all that is taught and disclosed therein.

FIELD OF THE INVENTION

The present invention relates to firearms, and more particularly to a system that measures initial velocity and time of flight of a bullet to a known distance, calculates a ballistic coefficient for the bullet, and enhances the ability of traditional predictive equations and procedures to accurately predict bullet paths for other distances and conditions.

BACKGROUND OF THE INVENTION

For the last 150 years, riflemen have attempted to predict the paths of bullets fired over a long range. The discovery that the bullet path is parabolic when the effects of air resistance are ignored was derived much earlier by Galileo. However, the computation becomes considerably more complicated when the slowing of the bullet caused by air resistance is considered. Air resistance is critical to consider in order to obtain an accurate prediction because air resistance is the primary force acting on a projectile. For modern rifle bullets, the force of air resistance can be 50 to 100 times stronger than the force of gravity. Newton postulated that the retarding force or drag on a bullet caused by air was proportional to the square of the bullet's velocity. A similar approach continues to be used by modern ballisticians.

Starting around 1850, Newton's basic idea was refined to the formula $F \propto G(v)v^2/C$, where F is the retarding force on the bullet, $\propto$ is read as "is proportional to," $G(v)$ is the "drag coefficient" defining the drag of the "standard bullet" as a function of velocity, v is the velocity of the bullet, and C is the "ballistic coefficient" or drag of the standard bullet divided by the drag of the tested bullet at a given velocity.

Predictions of exterior ballistics are made using the above equation starting at some initial velocity $V_0$ and integrating the acceleration (force) as a function of time to find velocity as a function of time. A second integration provides distance as a function of time. The initial velocity $V_0$ is often assumed from published ammunition specifications. It is also assumed that $G(v)$ is adequately represented by one of the standard drag functions (typically G1). It is further assumed that the ballistic coefficient C of the bullet is accurately known.

For 150 years, ballisticians have started with this set of assumptions and have made predictions of downrange performance. Their predictions have been computational extrapolations from characteristics measured near the muzzle and are based on the assumed drag function, estimated ballistic coefficient, and estimated initial velocity. These predictions have usually been sufficiently accurate to "get on paper" (hitting a portion of the target) at long range and the shooter expects to "come up or down a few clicks" to refine his sighting. There has been little effort to refine the predictions with actual long range tests. There has been no formal procedure to assure agreement between predictions and measured results at intermediate ranges. Mathematically, the ballisticians have performed two integrations, but have not applied a terminal value or condition to the results of the integration.

There are three primary sources of error in the predictions: the initial velocity $V_0$ can vary significantly from gun to gun, the assumed drag function $G(v)$ does not exactly fit the bullet, and the assumed ballistic coefficient can vary with velocity and from gun to gun.

It is instructive to look at a graph of bullet travel (distance) versus time. Referring now to FIG. 1, the x-axis shows the length of time that has passed since the bullet was discharged from the gun, and the y-axis shows the distance the bullet has traveled from the gun. The initial slope of the curve represents the initial velocity $V_0$ of the bullet, and the slope at any point represents the velocity at that time. The flattening of the curve indicates the velocity reduction that occurs as the bullet is slowed by air drag. The degree of curvature indicates the drag as velocity diminishes. The point shown near the end of the curve represents the cumulative effects of the drag applied to the initial velocity. This point characterizes the cumulative long range performance of the bullet, but has historically been neglected because it is difficult to measure. The current invention illustrates both the requirement for the measurement and a preferred method of measurement.

To make calculated bullet path predictions match reality, two conditions are essential. First, the initial slope must match the measured initial velocity. Second, the curve predicted from the assumed drag function and ballistic coefficient must pass through the measured long time and long distance point where the bullet impacts the target.

Better bullet path predictions are required by snipers and others wanting a high probability of a first round hit at long range. In recent years, snipers have been trained by Todd Hodnett, a well-known long-range shooting instructor, to use a procedure in which the initial velocity used in their predictions is "trued" or arbitrarily changed to make their predictions agree with actual shooting results at a specified long distance. This procedure provides a correction that works to accurately predict a bullet path at the specific distance measured. However, snipers need bullet path predictions for their firearms that are accurate at all distances.

Therefore, a need exists for a new and improved system for measuring exterior ballistics that measures initial velocity and time of flight of a bullet to a known distance, calculates a ballistic coefficient for the bullet, and enhances the ability of traditional predictive equations and procedures to accurately predict bullet paths for other distances and conditions. In this regard, the various embodiments of the present invention substantially fulfill at least some of these needs. In this respect, the system for measuring exterior ballistics according to the present invention substantially departs from the conventional concepts and designs of the prior art, and in doing so provides an apparatus primarily developed for the purpose of providing a system that measures initial velocity and time of flight of a bullet to a known distance, calculates a ballistic coefficient for the bullet, and enhances the ability of traditional predictive equations and procedures to accurately predict bullet paths for other distances and conditions.

Prior art Doppler radar systems are available that are capable of tracking a rifle bullet over long range and provide the same information as is measured by the current invention. The Doppler data is sufficiently complete that it yields a unique $G(v)$ drag coefficient exactly fitting the bullet under test. Hence the "ballistic coefficient" C becomes unity.

However, such Doppler systems are very expensive, they are not man-portable, and they require significantly more support.

SUMMARY OF THE INVENTION

The present invention provides an improved system for predicting exterior ballistics, and overcomes the above-mentioned disadvantages and drawbacks of the prior art. As such, the general purpose of the present invention, which will be described subsequently in greater detail, is to provide an improved system for predicting exterior ballistics that has all the advantages of the prior art mentioned above.

To attain this, the preferred embodiment of the present invention essentially comprises a first bullet detecting array operable to detect the passage of a bullet, a second bullet detecting array operable to detect the passage of a bullet, the first and second bullet detecting arrays being spaced apart by a selected distance, the first and second bullet detecting arrays each being connected to a common time signal facility that generates a time signal, the first array being operable to generate a velocity and first time of passage based on the time signal, and the second bullet detecting array being operable to generate a second time of passage based on the time signal. The distance between two detectors of the first array divided by the difference between the recorded times provides an indication of the initial velocity. Other bullet detecting arrays are placed at significantly longer spacing along the trajectory and are also used to record the time at which the bullet passes each array. The difference between the times recorded near the gun being tested and the times recorded at a down-range detector represent the flight time of the bullet. All timers are connected to a common data processing device. This device can compute the numerical value of the ballistic coefficient that will yield a predicted time of flight that matches the observed time of flight at the longest distance. While the ballistic coefficient C is customarily defined at one velocity as the ratio of the theoretical bullet drag divided by the tested bullet drag, the present invention considers the cumulative effect of the bullet drag over a distance approaching the maximum effective range of the bullet. It is recognized that the value of C measured by the present invention may differ slightly from the values of C at the various velocities encountered as the bullet velocity decays on the way to the target. It is most important that the value of C measured by the present invention, when applied with the legacy predictive equations, yields the same predicted time-of-flight over a long range that is observed experimentally. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

FIG. 5 is a schematic view of a test report of the current embodiment of the system for predicting exterior ballistics.

FIG. 6 is a top perspective view of the controller unit of the current embodiment of the system for predicting exterior ballistics of FIG. 2A.

The same reference numerals refer to the same parts throughout the various figures.

DESCRIPTION OF THE CURRENT EMBODIMENT

Figure 1:
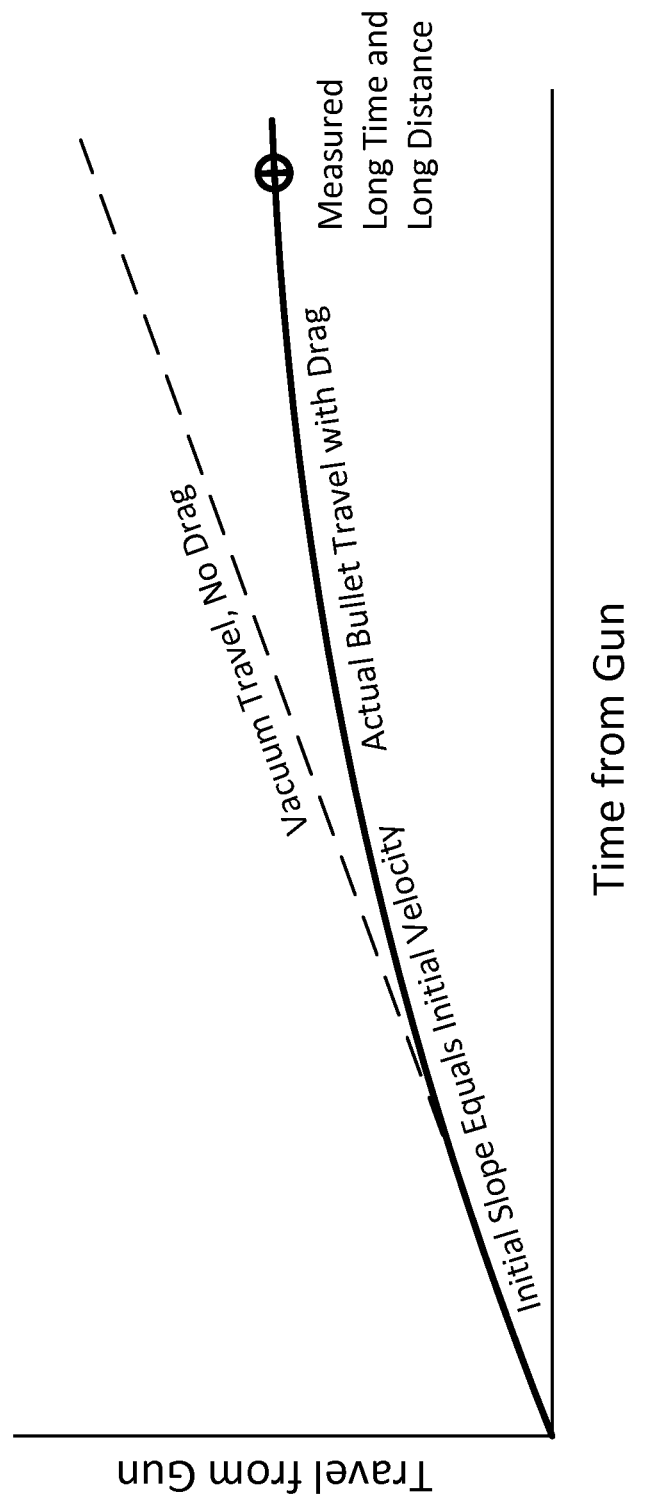
FIG. 1 is a graph of distance versus time for a bullet fired from a gun.

An embodiment of the system for predicting exterior ballistics of the present invention is shown and generally designated by the reference numeral 10.

Figure 2A:
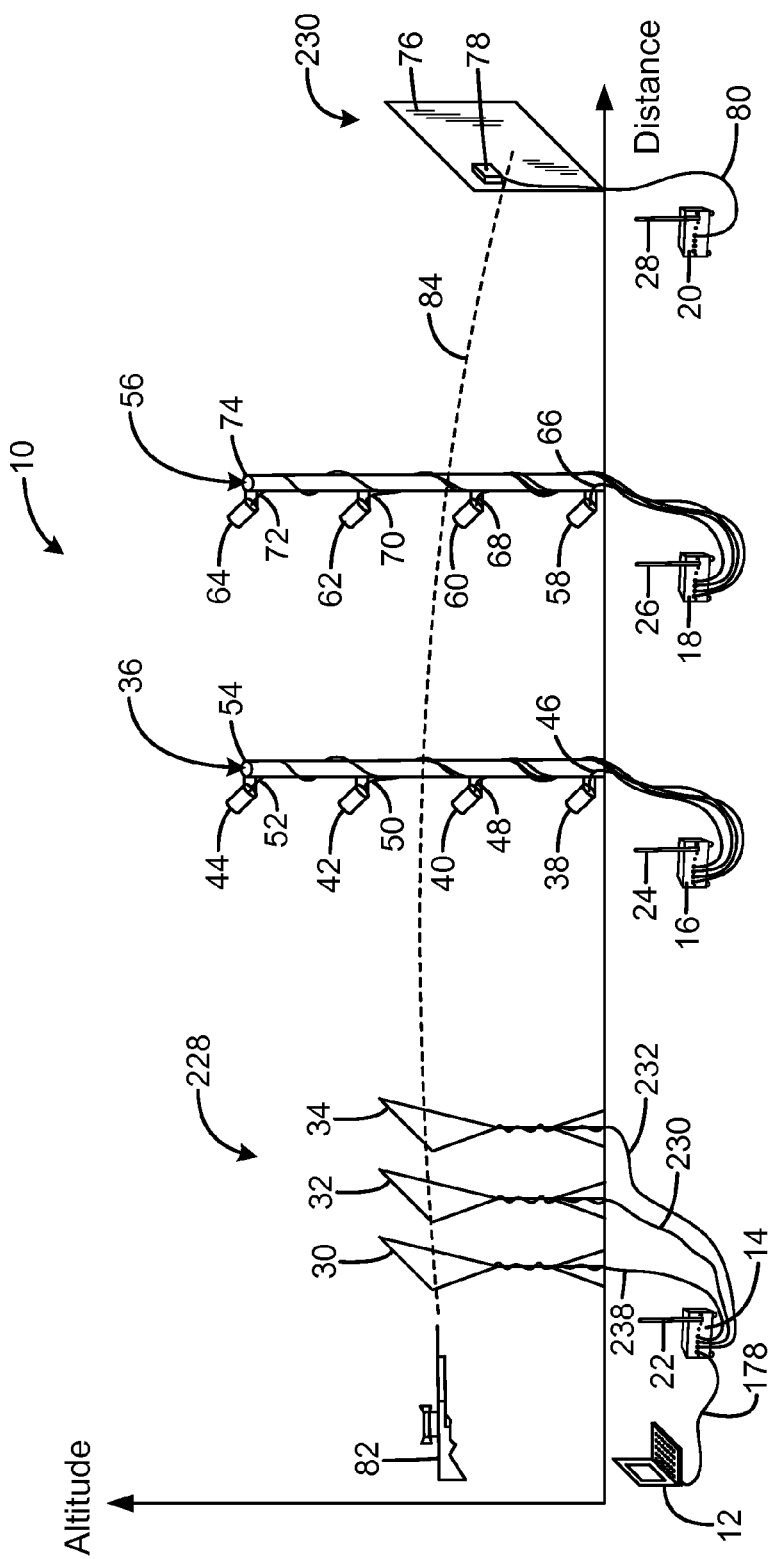
FIG. 2A is a schematic diagram of the current embodiment of a system for predicting exterior ballistics constructed in accordance with the principles of the present invention.
Figure 2B:
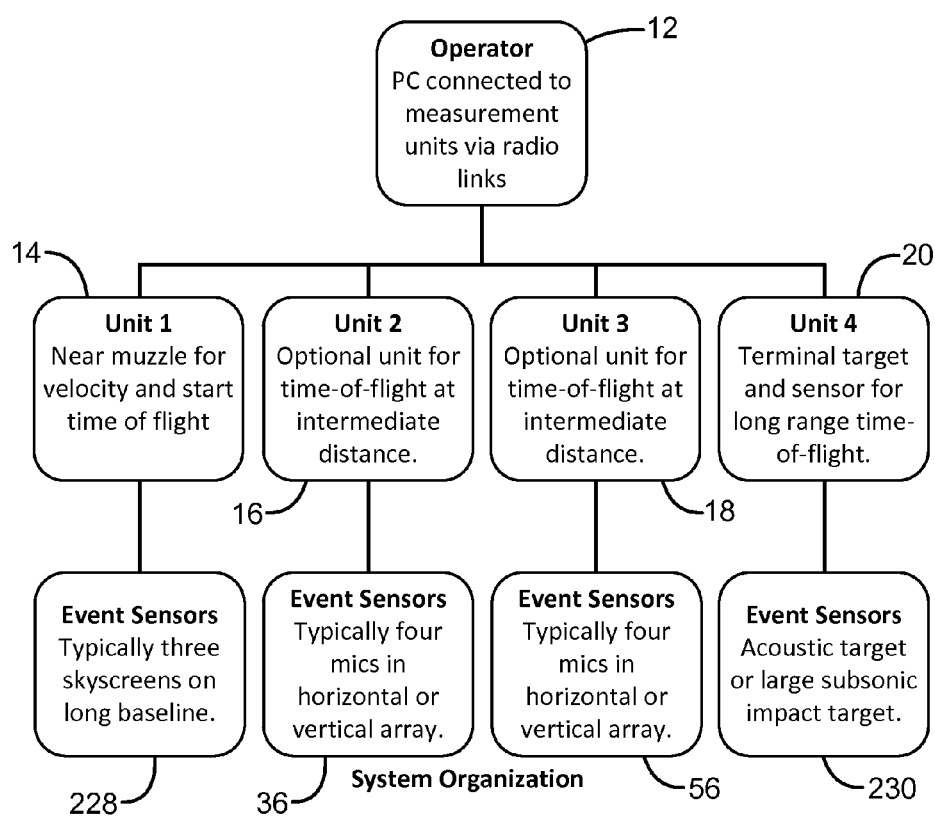
FIG. 2B is a block diagram of the current embodiment of a system for predicting exterior ballistics constructed in accordance with the principles of the present invention.

FIGS. 2A & 2B illustrate the improved system for predicting exterior ballistics 10 of the present invention. More particularly, the system 10 addresses the three primary sources of bullet path prediction errors. The system measures the initial velocity $V_0$ of the bullet from the gun 82 of interest using the muzzle velocity measurement unit 228. The system allows the assumption of a specific G(v) drag function approximately describing the bullet. Instead of requesting an input of the associated ballistic coefficient C, the system measures the initial velocity and time-of-flight to the known distance, and then computes the value of C required for the assumed G(v) to accurately predict the observed time-of-flight. This value of C can then be used with the assumed G(v) and the traditional predictive equations and procedures to accurately predict behavior at other ranges and conditions.

The system 10 uses two, three, or four measurement units/bullet detectors located downrange of the rifle 82 to be tested. Each measurement unit has a controller unit 14, 16, 18, 20 with a processor operable for wireless communication connected to each other in a radio network via antennas 22, 24, 26, 28. In the current embodiment, controller unit 14 is connected to a system controller in the form of a personal computer 12 via a cable 178, but the connection could also be made wirelessly. In the embodiment depicted in FIGS. 2A & 2B, the measurement units are muzzle velocity measurement unit 228, first vertical microphone array measurement unit 36, second vertical microphone array measurement unit 56, and terminal target measurement unit 230. Each measurement unit is capable of recording the times (synchronized to a Global Positioning System time signal and measured in microseconds after midnight) of four events for each shot. The time signal is transmitted to the measurement units by electromagnetic radiation, such that the distance between the measurement units detectors is inconsequential for time synchronization purposes.

At the gun, the events are signals from three Skyscreen™ III units 30, 32, 34 manufactured by Oehler Research, Inc. of Austin, Tex. positioned proximate the muzzle of the gun, which are used to measure the initial bullet velocity and to start the time-of-flight interval. At the terminal target measurement unit 230, or at intermediate acoustic measurement units 36, 56, the events are signals from up to four acoustic target microphones 38, 40, 42, 44, 58, 60, 62, 64, 78 connected by cables 46, 48, 50, 52, 66, 68, 70, 72, 80, 230, 232, 238 to first controller unit 14, second controller unit 16, third controller unit 18, and fourth controller unit 20. The intermediate acoustic measurement units provide a time-of-flight measurement of the bullet at intermediate distances by detecting the Mach cone of a passing supersonic bullet. The terminal target measurement unit provides the stop signal for the time-of-flight measurement of the bullet when the bullet impacts the target 76. Target 76 is an impact plate used to detect the arrival of the bullet if the bullet might be subsonic at the target. If the velocity of the bullet arriving at the target is supersonic, then an array of microphones can be used to detect the arrival. The distances between the muzzle Skyscreen™ III units 30, 32, 34 and each acoustic measurement unit 36, 56, 230 must be determined accurately by using a laser rangefinder or other survey techniques. In the current embodiment, the spacing between the first and last measurement unit is typically greater than 300 yards, and is preferably 1,000 yards or 1,000 meters. It is preferred that the terminal target be sufficiently distant that the velocity of the bullet had decreased to near the speed of sound.

It must be noted that the arrival times of the Mach cone at the microphones do not directly correspond to the time at which the bullet passed through the imaginary plane of the microphone array. The arrival times must be processed by the controlling computer using the measured initial velocity, the distance traveled, the assumed drag function, the air density indicated by temperature, pressure, and humidity, local speed of sound in air, and the location of the bullet path with respect to each microphone. These variables are processed using an iterative or successive approximation algorithm to yield the precisely estimated arrival time of the bullet at the plane of the target array and the ballistic coefficient required to accurately predict the time-of-flight matching the experimental value. This procedure assures that the predicted time versus distance curve passes through the experimental point.

It can also be noted that the ballistic coefficient derived using this process extends the common definition of ballistic coefficient to verify a match between measured values and predicted values at long distances. The legacy definition and measurement of ballistic coefficient is the ratio of the observed drag of the standard bullet divided by the drag of the tested bullet when measured near the muzzle. The extended definition of ballistic coefficient employed in the current invention will converge to give the same value as given by the legacy definition if the terminal distance is reduced to less than 300 meters.

It should also be noted that if the values of ballistic coefficients measured at the intermediate distances closely match each other and the ballistic coefficient measured at the terminal distance, then that correspondence provides positive verification that the assumed drag function describes the bullet tested. Even if the measured values do not match exactly, the procedure assures that predictions and measured values match at the longer ranges where the predictions are most important.

Figure 3:
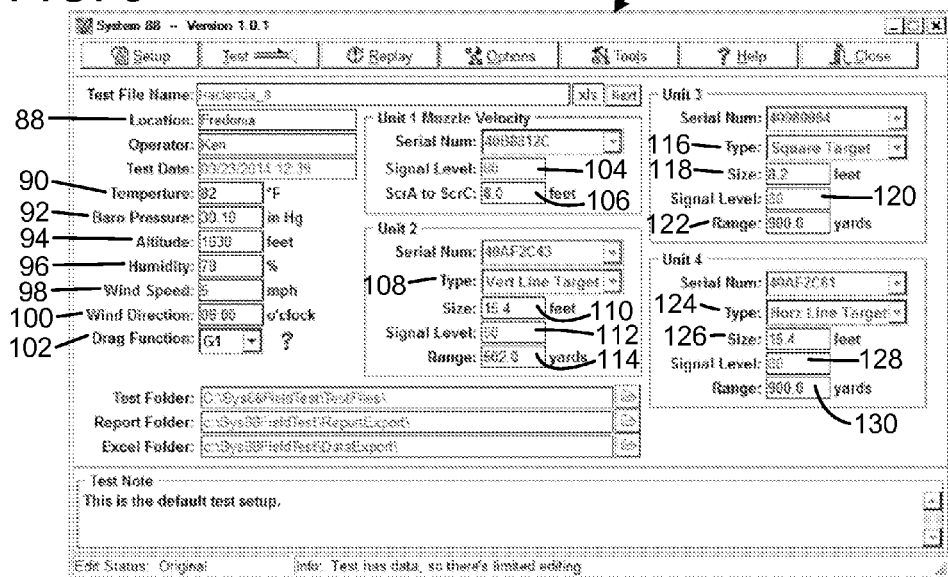
FIG. 3 is a schematic view of a setup screen of the current embodiment of the system for predicting exterior ballistics.

FIG. 3 illustrates the improved setup screen 86 of the present invention. More particularly, the setup screen enables an operator to enter information associated with the bullet path tests. On this screen, the operator enters essential parameters including the test location 88, temperature 90 and pressure 92 of the atmosphere, altitude 94, humidity 96, wind speed 98, wind direction 100, and the assumed drag function 102. For the muzzle velocity measurement unit 228, the operator enters the threshold signal level 104 and the distance between the first Skyscreen™ III unit 30 and the third Skyscreen™ III unit 34. For each downrange test unit except for the muzzle velocity measurement unit, the operator selects the sensor array type from a pull-down menu 108, 116, 124 and enters the array size 110, 118, 126, the threshold signal level 112, 120, 128, and the range 106, 114, 122, 130 from the first Skyscreen™ III unit 30 located near the muzzle of the rifle. The list of sensor array types includes Skyscreen™ III units for bullet velocity measurement, the four-microphone square array acoustic target 180 shown in FIG. 8, the four-microphone horizontal line array 204 shown in FIG. 9, the four-microphone vertical line array 36 shown in FIGS. 2A and 10 and the impact plate 76 shown in FIGS. 2A and 11. Space is provided for additional notes to be transferred to the permanent record. The operator is responsible for choosing descriptive test names and the information to be included in the test notes.

The operator provides separate folder addresses to receive the archived test data file, the test report, and the Excel data file. The Test Data Folder contains setup information along with the raw times recorded by the system 10 for each recognized event. Provision is made to replay the recorded tests with changes or corrections made to the original entries. A second file can be sent to the Excel Folder. This file contains the set-up, the times referenced to the start screen, the computed outputs, and the statistical summary of all channels. The Report Folder contains the output reports at the conclusion of a test firing or after replay of a test from the Test Data file. The printed report contains all the information from the test setup screen along with the shot-by-shot test results. Images of the target groups can also be included in the report. Test reports are saved in PDF format and can be directed to a connected printer.

Figure 4:
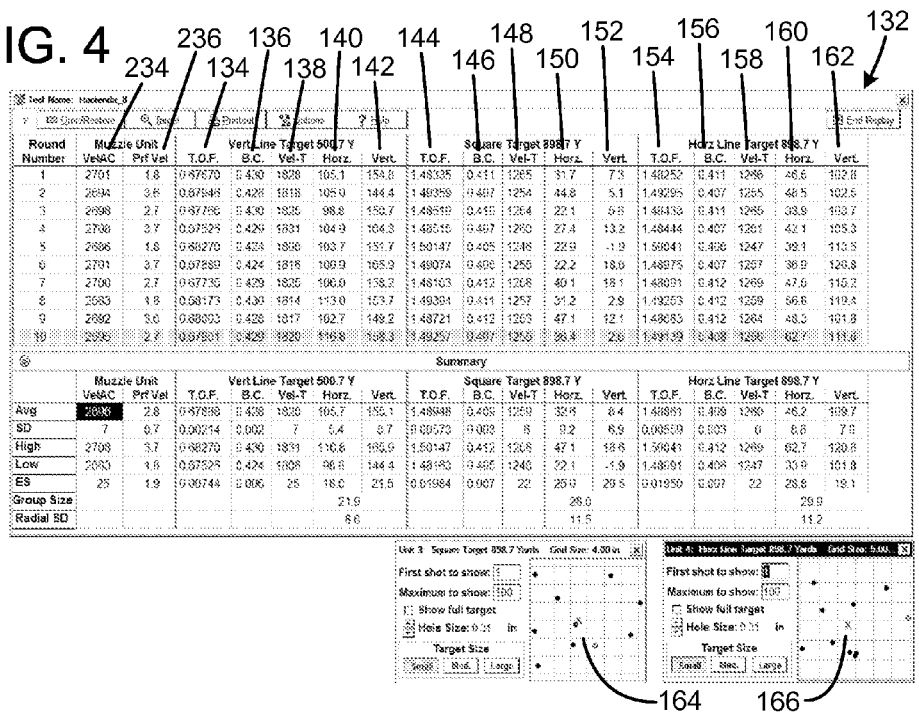
FIG. 4 is a schematic view of a testing screen of the current embodiment of the system for predicting exterior ballistics.

FIG. 4 illustrates the improved testing screen 132 of the present invention. More particularly, the testing screen displays the results obtained from each shot and statistics calculated once at least two shots have been measured. After a shot, the computer displays the initial velocity 234 along with the Proof velocity 236 difference indicating the accuracy of the measurement. For each downrange measurement unit, the system will display time-of-flight 134, 144, 154, calculated ballistic coefficient 136, 146, 156, estimated velocity at the measurement unit 138, 148, 158, and the apparent impact location coordinates (horizontal and vertical) 140, 142, 150, 152, 160, 162. Note that the displayed ballistic coefficient is computed so the application of conventional ballistic formulas and procedures will give a predicted time-of-flight equal to the observed time of flight. If the assumed drag function actually matches the bullet, then the indicated ballistic coefficients will be the same at all ranges and velocities and will match the legacy ballistic coefficients measured near the muzzle. As a result, the system controller can use conventional ballistic formulas and procedures to generate predicted bullet flight data, including bullet drop amount at a given distance and bullet velocity at a given distance.

A shot recognized at the muzzle start Skyscreen™ III measurement unit 30 is considered a valid shot; downrange event times falling within appropriate time intervals after the start signal are automatically processed. Downrange units recognize and report all events and automatically reset after collecting event times for a shot. Each downrange unit records and stores all recognized event times until they are transmitted over the radio network to the system controller in response to an interrogation command. Each downrange unit can recognize and store event times from multiple shots as it waits its turn to transmit its recorded data to the system controller. If the maximum firing rate is governed by the rule, "No more than one bullet in the air at one time," it is simple to assign downrange event times a particular shot. For faster firing rates, a replay of the collected data may be required for complete analysis of the collected event times. A spatial representation of the "holes" the bullet would have made in a target at each measurement unit's location is shown at 164, 166.

Figures 5, 6:
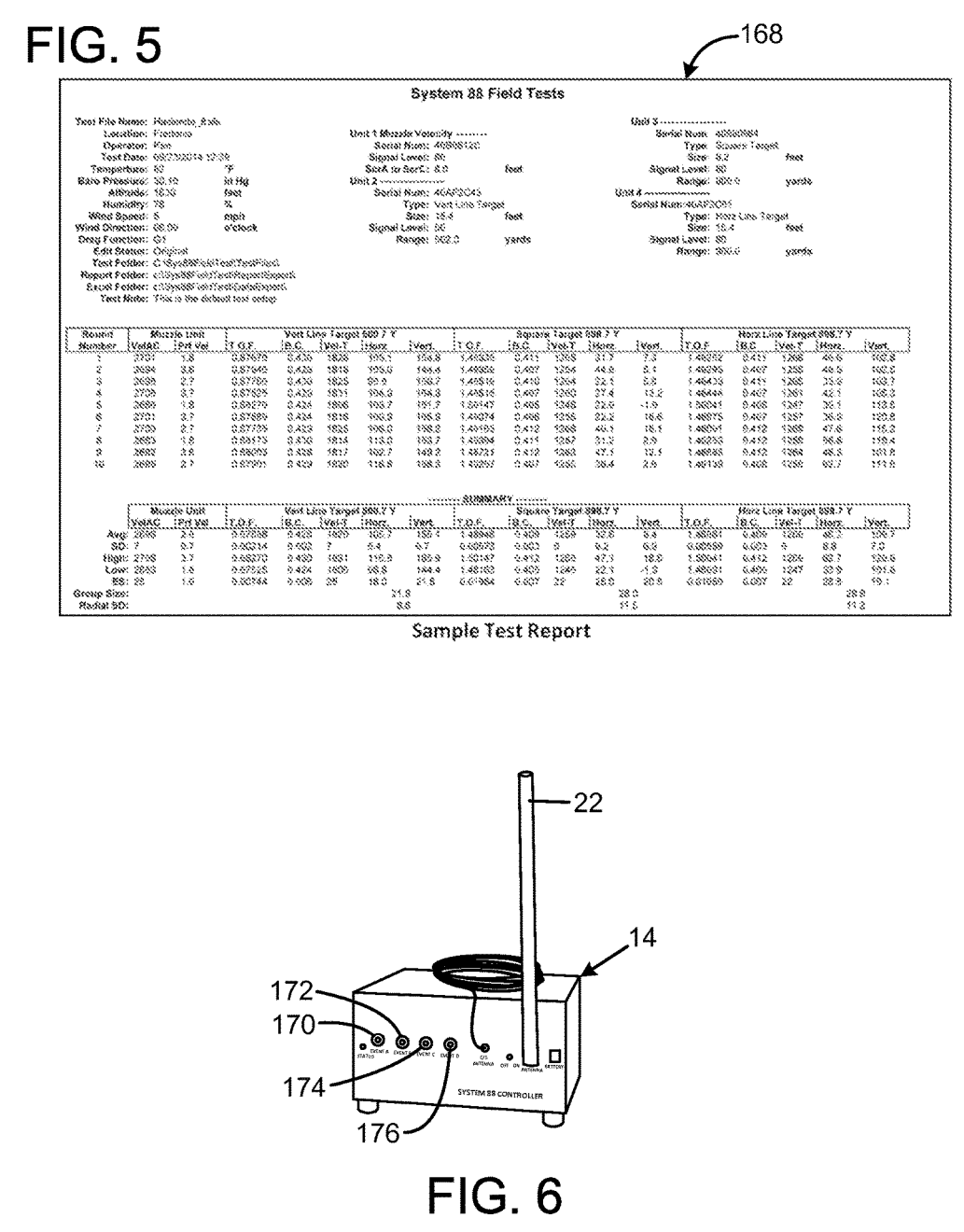

FIG. 5 illustrates the improved test report 168 of the present invention. More particularly, the test report is generated at the conclusion of each test group. The test report displays selected data from the setup screen 86 and testing screen 132. Since the test report is provided in PDF format, it can be easily stored, printed, or shared electronically.

FIG. 6 illustrates the improved controller unit 14 of the present invention. More particularly, the system 10 requires two or more controller units to collect the necessary data. The controllers are identical for convenience, but may differ according to function. At a minimum, one controller unit is required to measure initial velocity and one controller unit is required to measure time-of-flight. Each controller unit has an antenna 22 to enable wireless communication between the controller units and a system controller in the form of a personal computer 12 directly connected to one controller unit or indirectly connected to the controller units via the wireless network. Each controller unit has four ports 170, 172, 174, 176 to enable up to four event times to be recorded for each shot. Controller units 16, 18, 20 are identical to controller unit 14.

Figure 7:
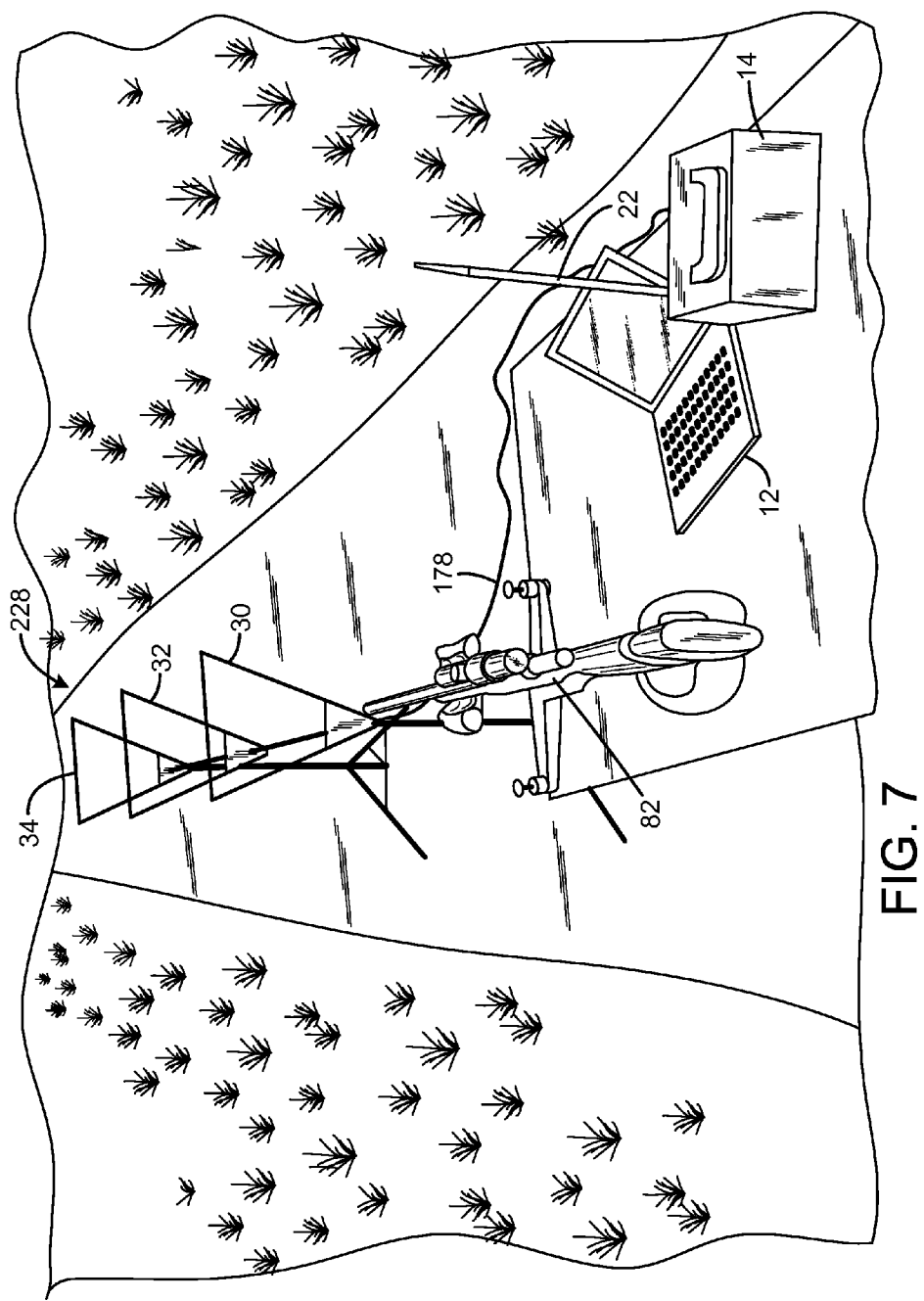
FIG. 7 is a rear perspective view of the muzzle velocity measurement unit and personal computer of the current embodiment of the system for predicting exterior ballistics of FIG. 2A.

FIG. 7 illustrates the improved muzzle velocity measurement unit 228 and personal computer 12 of the present invention. More particularly, the muzzle velocity measurement unit is located at the firing line where the rifle 82 to be tested is present. The muzzle velocity measurement unit includes a controller unit 14 and three Skyscreen™ III units 30, 32, 34 to measure the initial velocity of the bullet. While initial velocity may be measured with only two Skyscreen™ sensor units, the use of a third Skyscreen™ sensor provides a second measurement of velocity as a check. The personal computer 12 that controls and captures data from the measurement units 228, 36, 56, 230 is also typically located near the firing line.

Figure 8:
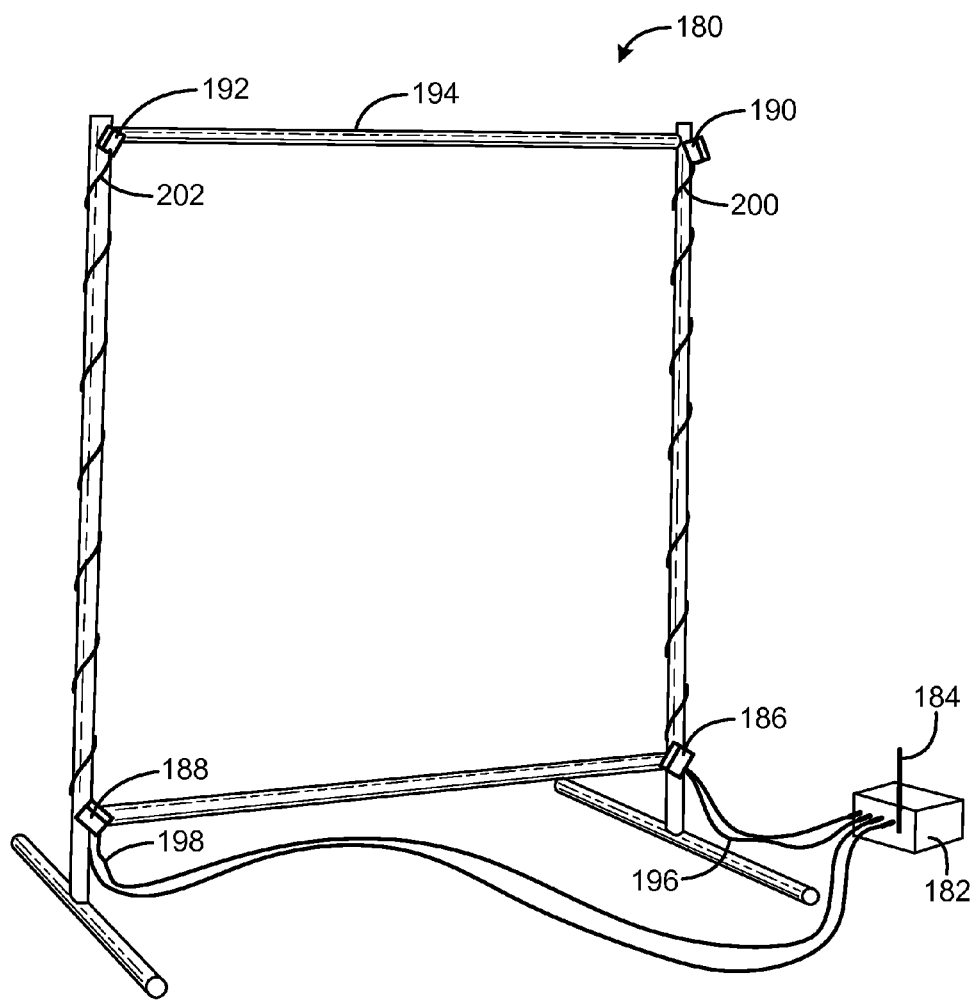
FIG. 8 is front perspective view of a square acoustic target of an alternative embodiment of the system for predicting exterior ballistics.

FIG. 8 illustrates the improved square acoustic target measurement unit 180 of the present invention. More particularly, the square acoustic target measurement unit has an upright square frame 194 with four microphones 186, 188, 190, 192 installed at each corner of the square. The microphones are connected to a controller unit 182 by cables 196, 198, 200, 202. The controller unit has an antenna 184 that enables wireless communication with other controller units. The square acoustic target measurement unit provides a time-of-flight measurement of the bullet at the distance the square acoustic target measurement unit is positioned from the rifle 82 being tested by detecting the Mach cone of a passing supersonic bullet.

Figure 9:
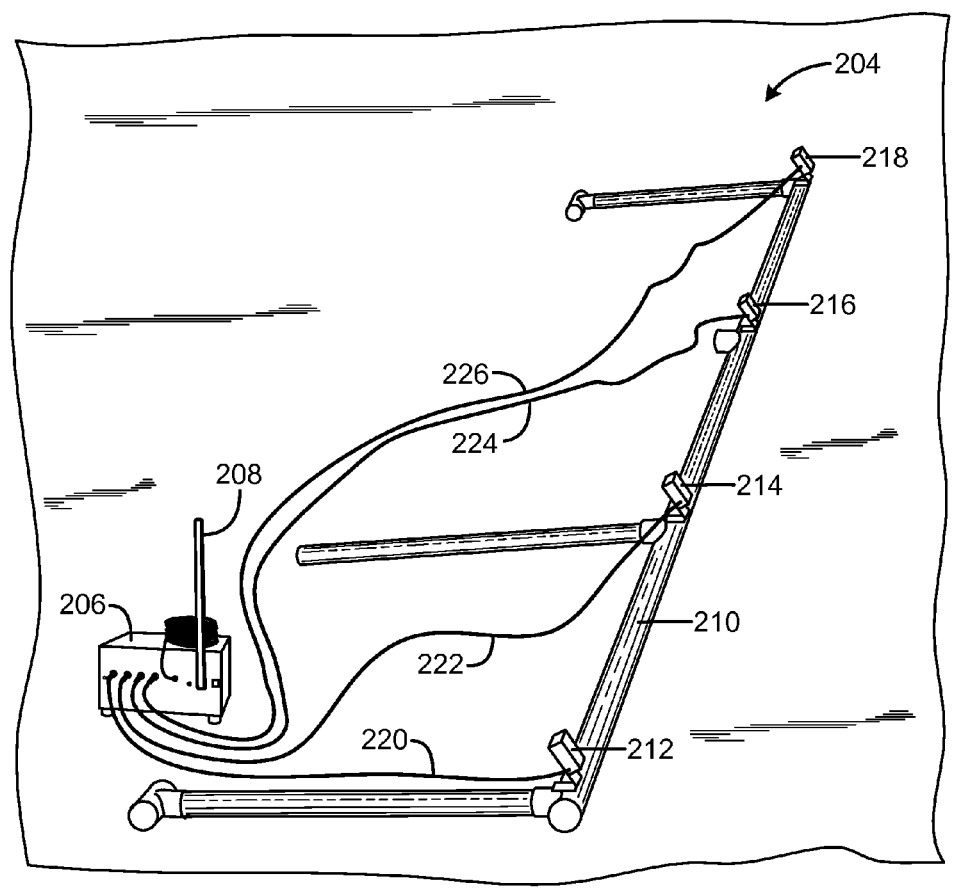
FIG. 9 is a top perspective view of a horizontal microphone array measurement unit of an alternative embodiment of the system for predicting exterior ballistics.

FIG. 9 illustrates the improved horizontal microphone array measurement unit 204 of the present invention. More particularly, the horizontal microphone array measurement unit has four microphones 212, 214, 216, 218 arranged in a horizontal line in a frame 210 positioned normal to the path of the bullet. This configuration is exceptionally easy to deploy in the field. The microphones are connected by cables 220, 222, 224, 226 to controller unit 206. The controller unit has an antenna 208 that enables wireless communication with other controller units. The horizontal microphone array measurement unit provides a time-of-flight measurement of the bullet at the distance the horizontal microphone array measurement unit is positioned from the rifle 82 being tested by detecting the Mach cone of a passing supersonic bullet.

Figure 10:
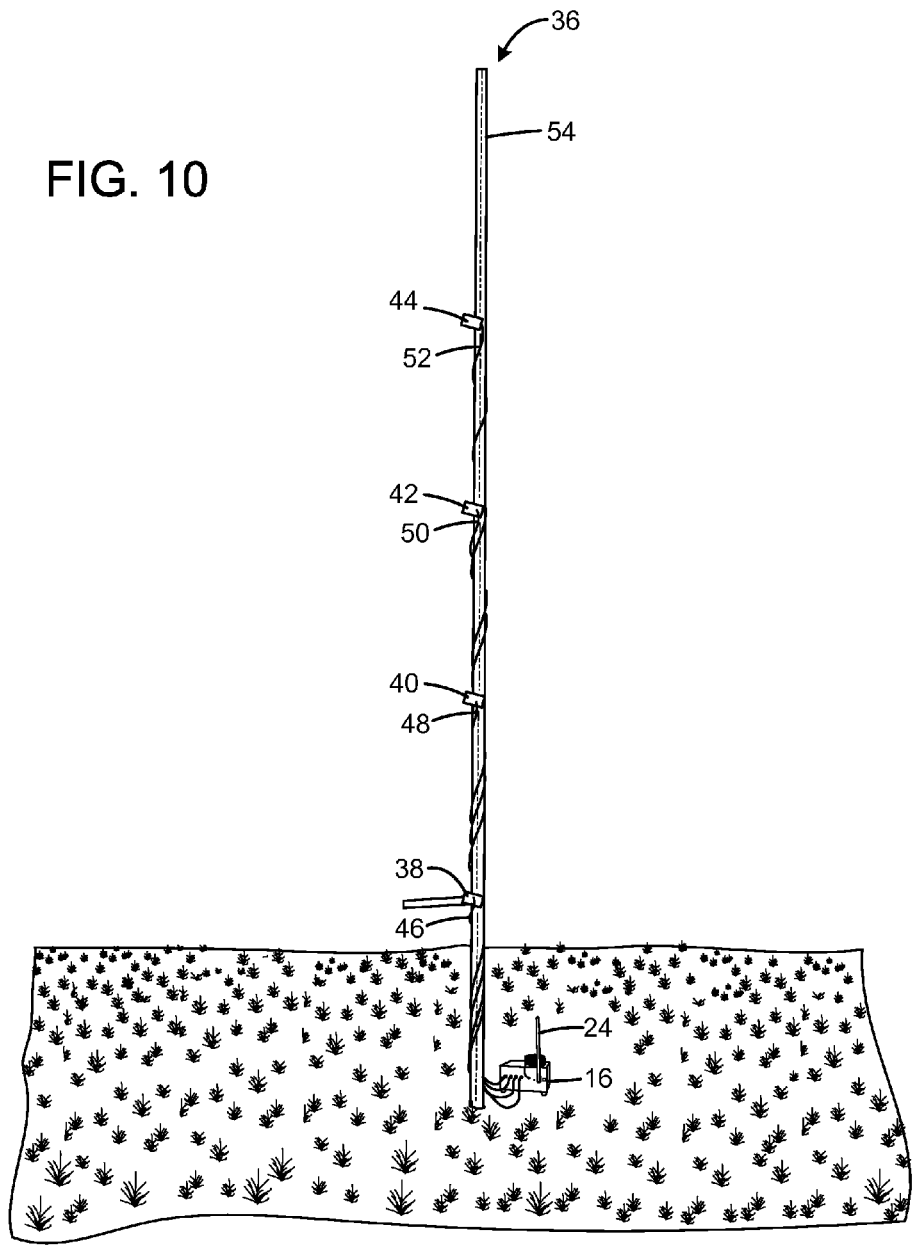
FIG. 10 is a top perspective view of the vertical microphone array measurement unit of the current embodiment of the system for predicting exterior ballistics of FIG. 1.

FIG. 10 illustrates the improved first vertical microphone array measurement unit 36 of the present invention. More particularly, the first vertical microphone array measurement unit has four microphones 38, 40, 42, 44 attached in a vertical line to a pole 54 at midrange positions. This vertical placement allows the bullet to pass within a reasonable distance of the microphone array even when the midrange portion of the bullet path is high above the ground. Cables 46, 48, 50, 52 connect the microphones to second controller unit 16. The controller unit has an antenna 24 that enables wireless communication with other controller units. The microphone array measurement unit provides a time-of-flight measurement of the bullet at the distance the (microphone array measurement unit is positioned from the rifle 82 being tested by detecting the Mach cone of a passing supersonic bullet. The second vertical microphone array measurement unit 56 is identical to the first vertical microphone array measurement unit.

Figure 11:
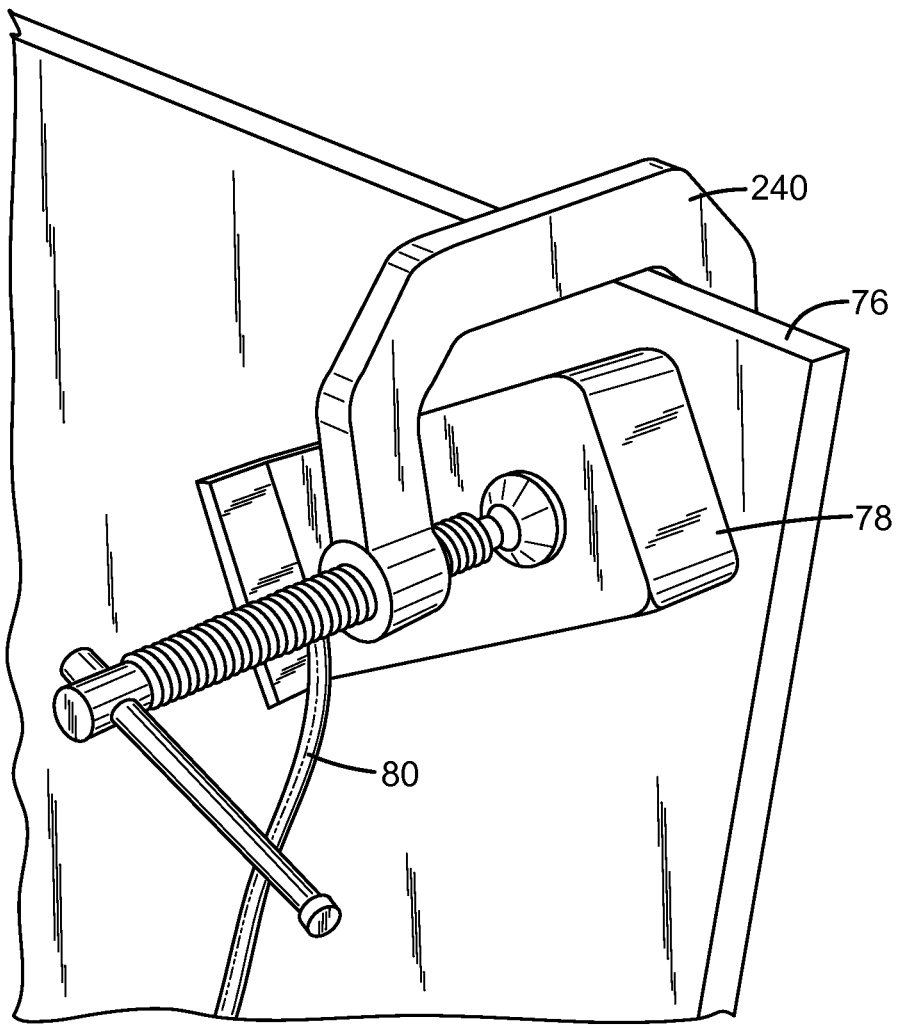
FIG. 11 is an enlarged partial view of the target impact plate measurement unit of the current embodiment of the system for predicting exterior ballistics of FIG. 1.

FIG. 11 illustrates the improved terminal target measurement unit 230 of the present invention. If the bullet is subsonic, then the bullet has no Mach cone, and cannot be detected with the microphones. To allow detection of both supersonic and subsonic bullets, a terminal target measurement unit has one or more microphones 78 that are clamped by a C-clamp 240 to an impact plate target 76. One or more microphones can be mounted to a large sheet of plywood or metal as a "stethoscope." The microphone 78 records the terminal arrival time of a bullet by hearing the sound of the impact of the bullet. This sound is transmitted at high speed through the impact plate to the attached microphone, which generates a stop signal for the time-of-flight measurement without significant delay.

While a current embodiment of a system for predicting exterior ballistics has been described in detail, it should be apparent that modifications and variations thereto are possible, all of which fall within the true spirit and scope of the invention. It must be recognized that the specific means of detection implied in this description are not unique. For example, the detectors located near the gun may use magnetic, optical, acoustic, or radar activated detection instead of the Skyscreen™ III units shown; the detectors used downrange may use optical or other means to replace the acoustic means illustrated. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ballistic trajectory system comprising:
a first bullet detector operable to detect the passage of a bullet;
a second bullet detector operable to detect the passage of a bullet;
the first and second bullet detectors being spaced apart by a selected detector spacing distance;
the first and second bullet detectors each being connected to a common time signal facility that generates a time signal;
wherein the time signal is a global positioning satellite signal;
the first bullet detector being operable to generate a first time of passage based on the time signal;
the second bullet detector being operable to generate a second time of passage based on the time signal;
the first bullet detector being operable to measure a first bullet velocity;
a controller in communication with the first and second bullet detectors; and
the controller operable based on the difference between the first time and the second time,
and based on the first bullet velocity to calculate a ballistic characteristic for the bullet.

2. The system of claim 1 wherein the selected spacing distance is at least 300 yards.

3. The system of claim 1 wherein the selected spacing distance is on the order of magnitude of the effective range of a rifle cartridge.

4. The system of claim 1 wherein the selected spacing distance is comparable to the distance over which the velocity of a rifle cartridge decays to approximately the speed of sound.

5. The system of claim 1 wherein the selected spacing distance is selected from the group consisting of 1,000 meters or 1,000 yards.

6. The system of claim 1 wherein the time signal is transmitted to the first and second bullet detecting arrays by electromagnetic radiation, such that the distance between the first and second bullet detecting arrays is inconsequential for time synchronization purposes.

7. The system of claim 1 wherein the first and second bullet detecting arrays are wirelessly connected to the controller.

8. The system of claim 1 wherein the first bullet detector is positioned proximate the muzzle of a firearm such that the first bullet detecting array measures the initial bullet velocity.

9. The system of claim 1 including a third bullet detecting array aligned between the first and second bullet detecting arrays.

10. The system of claim 1 including third and fourth bullet detecting arrays aligned between the first and second bullet detecting arrays.

11. The system of claim 1 wherein each of the bullet detecting arrays includes a respective processor and a bullet sensor, and wherein each processor is operable for wireless communication to the controller.

12. The system of claim 1 wherein the ballistic characteristic is a ballistic coefficient.

13. The system of claim 1 wherein the controller is operable to generate predicted bullet time-of-flight data based on the measured velocity and the calculated ballistic characteristic.

14. The system of claim 13 wherein the predicted bullet flight data is a bullet drop amount at a given distance.

15. The system of claim 13 wherein the predicted bullet flight data is a bullet velocity at a given distance.

16. A ballistic trajectory system comprising:
an array of two or more bullet detectors operable to detect and signal passage of a bullet with the detectors located near a firearm to be tested and precisely spaced at known distances along the expected trajectory;
each detector being connected to a timer to record a time of passage of a bullet fired from the firearm;
wherein the timer generates the time of passage from a global positioning satellite signal;
a second array of detectors located a selected spacing distance from the firearm being operable to detect passage of a bullet and to record the time of passage of the bullet fired from the firearm;
the first array being operable to measure initial bullet velocity;
the second array being operable to measure a time-of-flight over the selected distance;
a controller in communication with the first and second arrays; and
the controller operable based on the time-of-flight and the initial bullet velocity to calculate a ballistic characteristic for the bullet.

17. The system of claim 16 wherein the selected spacing distance is at least 300 yards.

18. The system of claim 16 wherein the ballistic characteristic is a ballistic coefficient.

19. The system of claim 16 wherein the controller is operable to generate predicted bullet flight data based on the measured velocity and the calculated ballistic characteristic.

* * * * *